US010887660B2

(12) United States Patent
Mao et al.

(10) Patent No.: US 10,887,660 B2
(45) Date of Patent: Jan. 5, 2021

(54) COLLABORATIVE MEDIA QUALITY DETERMINATION

(71) Applicant: Comcast Cable Communications, LLC, Philadelphia, PA (US)

(72) Inventors: Weidong Mao, West Windsor, NJ (US); Jason Press, Bryn Mawr, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 16/234,021

(22) Filed: Dec. 27, 2018

(65) Prior Publication Data

US 2020/0213675 A1 Jul. 2, 2020

(51) Int. Cl.
*H04N 7/173* (2011.01)
*H04N 21/647* (2011.01)
*H04L 29/06* (2006.01)
*H04N 21/262* (2011.01)

(52) U.S. Cl.
CPC ......... *H04N 21/647* (2013.01); *H04L 65/601* (2013.01); *H04L 65/80* (2013.01); *H04N 21/26258* (2013.01)

(58) Field of Classification Search
None
See application file for complete search history.

(56) References Cited

U.S. PATENT DOCUMENTS

| 10,104,143 | B1* | 10/2018 | Li .................... H04L 67/02 |
| 2013/0042015 | A1 | 2/2013 | Begen et al. |
| 2013/0198401 | A1* | 8/2013 | van Doorn ......... H04L 65/607 709/231 |
| 2014/0201324 | A1 | 7/2014 | Zhang et al. |
| 2014/0280688 | A1* | 9/2014 | Mao .................. H04L 67/2847 709/214 |
| 2015/0341411 | A1* | 11/2015 | Huber ................ H04L 65/4092 709/231 |
| 2016/0088054 | A1 | 3/2016 | Hassan et al. |
| 2016/0088322 | A1 | 3/2016 | Horev et al. |
| 2016/0112732 | A1* | 4/2016 | Li ..................... H04L 65/605 725/116 |
| 2016/0337680 | A1* | 11/2016 | Kalagi ............... H04N 21/2662 |
| 2018/0020036 | A1 | 1/2018 | Ramamurthy et al. |
| 2018/0124146 | A1* | 5/2018 | Chen .................. H04L 65/4069 |

\* cited by examiner

*Primary Examiner* — William J Kim
(74) *Attorney, Agent, or Firm* — BakerHostetler

(57) ABSTRACT

A playback device may determine a quality measurement associated with one or more versions of a content fragment. The quality measurements may be based on one or more encoding characteristics associated with the plurality of versions of the content fragments. The quality measurements may be received by a content delivery system from the one or more devices and may be used by the content delivery system in determining a content playlist. By determining the quality measurements at the user device side, a larger number of quality measurements may be received and more accurate quality measurements may be utilized for determining the content playlist.

21 Claims, 5 Drawing Sheets

COLLABORATIVE MEDIA QUALITY DETERMINATION

BACKGROUND

A content asset may comprise a number of content fragments, each of the content fragments corresponding to a portion of the content asset. A content server may be configured to determine a quality measurement associated with the content asset and to send the content asset based on the determined quality measurement to one or more devices capable of playing back the content asset. However, it may be desirable to provide a mechanism that enables quality measurements to be determined at the receiving side (e.g., a user device) rather than at the content server side.

SUMMARY

Methods and systems are disclosed for determining a content playlist based on device side quality measurements of one or more content fragments. A playback device may be configured to determine a quality measurement associated with one or more versions of a content fragment. The quality measurements may be based on one or more encoding characteristics associated with the plurality of versions of the content fragments. The quality measurements may be received by a content delivery system from the one or more devices and may be used by the content delivery system in determining a content playlist. By determining the quality measurements at the user device side, a larger number of quality measurements may be received and more accurate quality measurements may be utilized for determining the content playlist.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

A content server may be configured to determine a quality measurement of a content asset and to send the content asset to one or more devices configured to play back the content asset. However, due to a large amount of variation in content delivery systems, such as variation in the geographical location of system devices and a variation in network conditions (e.g., bandwidth, latency and packet loss), media quality measurements performed at the content server side may be inconsistent. Thus, it may be desirable to provide a mechanism by which a quality measurement of a content fragment can be determined at the device side in order to reduce variation in content quality measurements. Disclosed herein are methods and systems for performing quality measurements of content fragments at a user device and determining a content playlist at the content server based on the received quality measurements.

Figure 1:
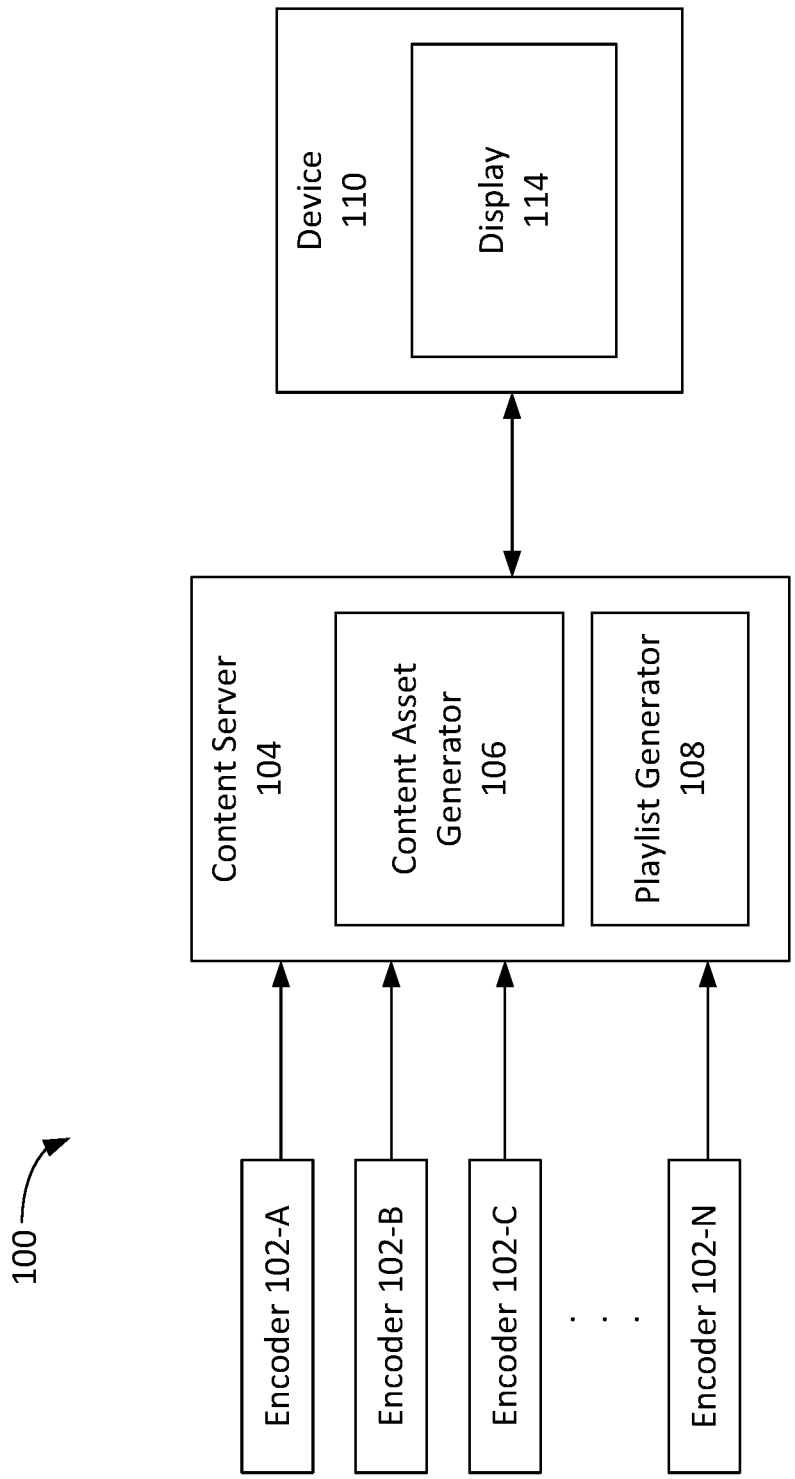
FIG. 1 is a block diagram of an example system.

FIG. 1 shows an example content delivery system 100 for collaborative media scoring. The system 100 may comprise a content server 104 and a device 108. The content server 104 may comprise a content asset generator 106 and a playlist generator 108. The content server 104 may be configured to receive input from one or more encoders 102. The device 108 may comprise a display 112.

The one or more encoder(s) 102 may be configured to encode one or more content assets. An input to the one or more encoders 102 may comprise a content asset received from one or more sources such as the content delivery system 100. The content asset may be received in any one of a variety of formats, such as H.262, H.264, H.265, MPEG-4 Part 2, or MPEG-2, and may be transmitted using one or more standards such as SCTE-35 or other specifications. Although reference may be made to example standards (e.g., MPEG) and formats, one of skill in the art will recognize that the systems and methods described herein are applicable to any format or standard that support audio and/or video. The combined MPEG-1, MPEG-2, and MPEG-4 or other MPEG standards are hereinafter referred to as MPEG.

The output of a single MPEG audio and/or video codec may be referred to herein as a transport stream. In an MPEG encoded transmission, content and other data are transmitted in packets, which collectively make up the transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts may ensure that every packet that is needed to decode a stream is received. A synchronization system may be used so that decoders may correctly identify the beginning of each packet and deserialize the bit stream into words.

A content asset, which may include multimedia assets (e.g., television assets, movie assets, audio assets, streaming media assets, video on demand (VOD) assets, etc.) may comprise a group of one or more PIDs that are related to each other. For example, a multi program transport stream used in digital television might contain three programs, to represent three television channels. Each channel may comprise one video stream, one or two audio streams, and any necessary metadata. A receiver attempting to tune to a particular "channel" merely has to decode the payload of the PIDs associated with its program. The receiver may discard the contents of all other PIDs.

The one or more encoders 102 may output one or more content fragments associated with a content asset. Each of the one or more content fragments may comprise one or more encoding characteristics. The one or more encoders 102 may be configured to encode a content fragment based on the one or more encoding characteristics. Different encoding characteristics applied to the content fragment may produce different versions or variations of the content fragment, such as differences in the video and audio quality of the content fragment. The encoder 102-A may be configured to output content fragments encoded with one or more characteristics that produce high quality video content. The encoder 102-B may be configured to output content fragments encoded with one or more characteristics that produce high quality audio content. It is understood that the content server 104 may receive input from any number of encoders 102 and that the encoders 102 may be configured to output content fragments having any number and any type of encoding characteristics.

The content server 104 may be configured to receive as input from the one or more encoders 102 one or more content fragments associated with one or more content assets. Specifically, the content asset generator 106 may be configured to receive the one or more content fragments associated with the one or more content assets. The content asset generator 106 may receive from the encoders 102 a plurality of versions of a content fragment. Each of the plurality of versions of the content fragment may comprise different encoding characteristics. Each of the plurality of versions of the content fragment may correspond to a content fragment received from a select one of the encoders 102. The content asset generator 106 may receive a first version of a content fragment from encoder 102-A and may receive a second version of the content fragment from encoder 102-B. The content asset generator 106 may be configured to generate a content asset comprising a selected version of the content fragment and to send the content asset to the device 110.

The device 110 may be configured to receive a content asset comprising one or more content fragments. The device 110 may be any device that is capable of playback of the content asset. The device 110 may comprise a display 112 that is configured to display the content asset. The display 112 may be configured to display audio and/or video content associated with the content asset. The display 112 may be part of the device 110 such as in the example that the device 110 is a laptop or cellular telephone. Additionally or alternatively, the display 112 may be separate from the device 110 such as in the example that the device 110 is a set-top box.

The device 110 may be configured to receive the content asset and to determine a quality measurement of one or more content fragments associated with the content asset. The device 110 may be configured to assign a value to a content fragment based on a scale (e.g., from one to ten) corresponding to the quality of the corresponding content fragment. The device 110 may be configured to determine a quality measurement associated with the content fragment based on one or more objective measurements and/or one or more subjective measurements.

The objective measurements may be based on one or more algorithms stored in the device 110. The algorithms may be based on a peak signal to noise ratio of the content fragments. The peak signal to noise ratio may be determined based on the maximum possible power of one or more signals in the content fragments and the power of corrupting noise that affects the fidelity of its representation. The algorithms may be based on a structural similarity index of the content fragments. The structural similarity (SSIM) may be used to determine a perceived image or video quality of a content fragment based on a similarity between two or more images in the content fragment. It is understood that the algorithms are not limited to these examples and may include any algorithms capable of determining a quality measurement of a content fragment.

The quality measurements associated with the one or more content fragments may be output by the device 110 to the content server 104. The subjective measurements may include but are not limited to a mean objective score assigned to the one or more content fragments.

The content server 104 may be configured to receive from the device 110 the quality measurements associated with the one or more content fragments. Specifically, the playlist generator 108 may be configured to receive the quality measurements associated with the one or more content fragments. The playlist generator 108 may receive the quality measurements from a plurality of devices 110. The playlist generator 108 may receive one or more quality measurements associated with a version of a content fragment and one or more quality measurements associated with another version of the content fragment. The playlist generator 108 may determine a playlist comprising a selected one of the versions of the content fragment based on the associated quality measurements of the plurality of versions of the content fragment. It is understood that the content asset may comprise any number of content fragments, one or more of the content fragments being selected from among a number of available versions of the content fragment.

Figure 2:
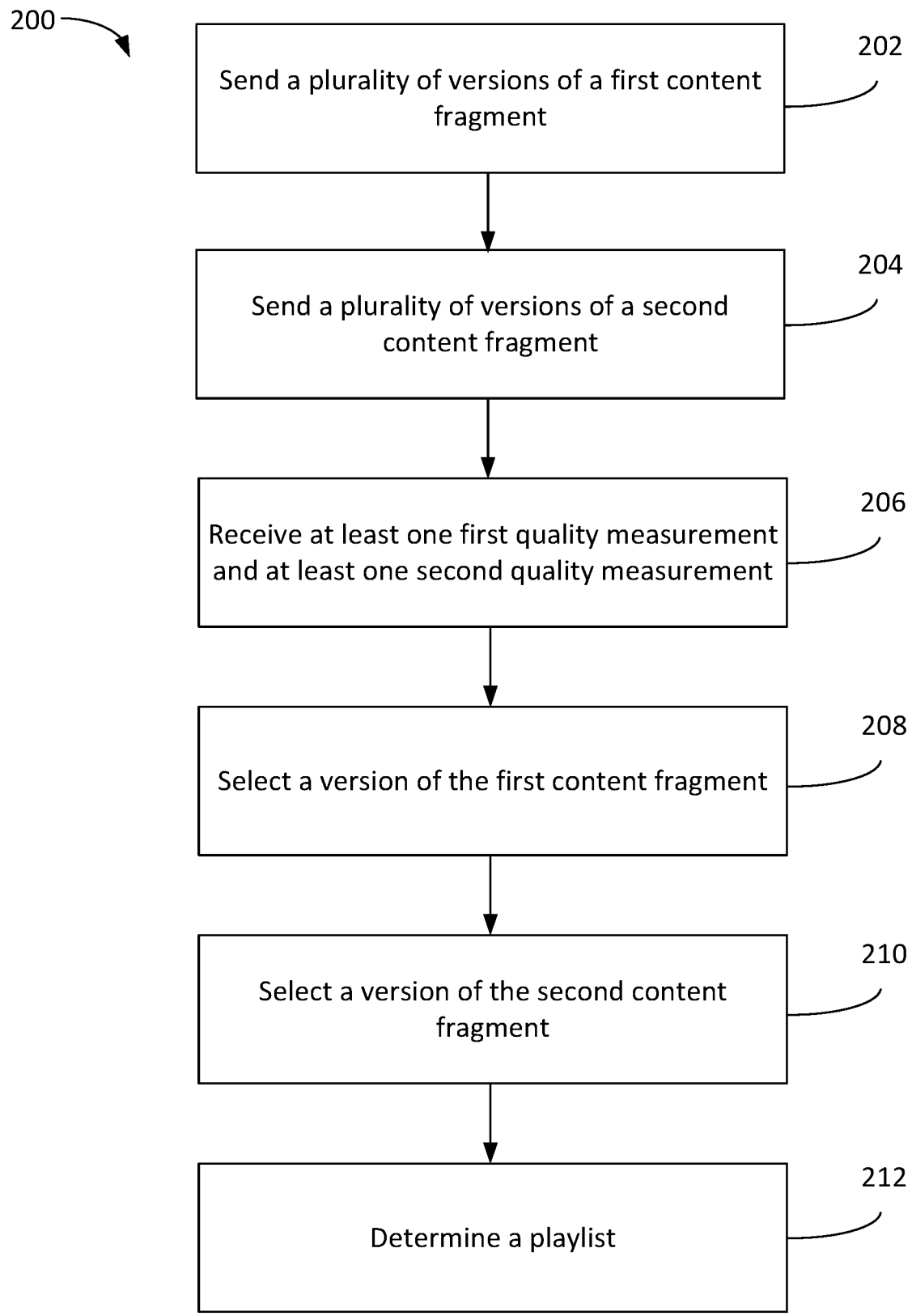
FIG. 2 is a flow chart of an example method.

FIG. 2 shows a flow chart of an example method 200 for determining a content playlist based on media quality measurements. At step 202, a plurality of versions of a first content fragment may be sent to one or more devices. The plurality of versions of the first content fragment may be associated with a content asset. The content asset may comprise any media asset that is capable of being played back by a device, such as a movie asset, a television asset, or a streaming media asset. The first content fragment may correspond to a portion of the content asset, such as a two second portion of the content asset or a ten second portion of the content asset.

At step 202, a plurality of versions of a second content fragment may be sent to one or more devices. The plurality of versions of the second content fragment may be associated with a content asset. The content asset may comprise any media asset that is capable of being played back by a device, such as a movie asset, a television asset, or a streaming media asset. The second content fragment may correspond to a portion of the content asset, such as a two second portion of the content asset or a ten second portion of the content asset.

It is understood that the first version of the content fragment and the second version of the content fragment may be sent to the one or more devices in any number of combinations not limited to the examples provided. The first version of the content fragment may be sent to a first group of one or more devices while the second version of the content fragment may be sent to a second group of one or more devices. The first version of the content fragment and the second version of the content fragment may be sent to the same group of one or more devices. The first version of the content fragment and the second version of the content fragment may be sent to the same device. The first version of the content fragment may be sent to a first device and the second version of the content fragment may be sent to a second device.

The first version of the content fragment may comprise a first type of encoding and the second version of the content fragment may comprise a second type of encoding. The plurality of versions of the content fragment may have been determined by one or more encoders. An encoder may be configured to encode a content fragment using a first type of encoding and another encoder may be configured to encode the content fragment using a second type of encoding. Each of the first type of encoding and the second type of encoding may comprise one or more characteristics that make the corresponding version of the content fragment more favorable based on one or more characteristics of the content fragment and/or one or more characteristics of the device requesting playback of the content fragment. One type of encoding may be preferred for determining a content fragment with high-quality still images, another type of encoding may be preferred for determining a content fragment with high-quality video, and another type of encoding may be preferred for determining a content fragment with high-quality audio.

At step 206, an indication of a quality measurement associated with one or more of the plurality of versions of the first content fragment may be received. An indication of a quality measurement associated with one or more of the plurality of versions of the second content fragment may be received. The indications of the quality measurements may be received from the one or more devices, such as the device 110 shown in FIG. 1. A quality measurement associated with a content fragment may correspond to objective and/or subjective measurements associated with presentation of the content fragment by the playback device. The quality measurements may be observed by a playback device, such as in a quality determination module of the device 110. The quality measurements may be based on a ratings scale, such as a scale ranging from one to ten. It is understood that the quality measurements may comprise any format and are not limited to a ratings scale. It is also understood that the indication of the quality measurement associated with one or more of the plurality of versions of the first content and the indication of the quality measurement associated with one or more of the plurality of versions of the second content fragment may be received independent of or without sending the plurality of versions of the first content fragment and the plurality of versions of the second content fragment to the one or more devices.

An objective quality measurement may be based on one or more algorithms used by the device to determine a media quality (e.g., a video quality and/or an audio quality) associated with presentation of the content fragment. The one or more devices may receive a particular content fragment that comprises video content with fast moving images and does not comprise substantial audio content. The one or more devices may be configured to receive a plurality of versions of the content fragment and to assign a rating to each version of the content fragment based on the encoding characteristics applied to the version of the content fragment. A content fragment output by a first encoder known to produce high quality audio content but low quality video content may be assigned a rating of three out of ten while a content fragment output by an encoder known to produce high quality video content but low quality audio content may be assigned a rating of nine out of ten. The quality measurements may be based on one or more characteristics of the one or more devices, such as a maximum video playback quality supported by the device. The quality measurements may be based on a geographical location of the one or more devices.

Subjective measures may also be utilized that allow one or more users to assign a quality measurement to a version of the content fragment based on playback of the content fragment by one or more devices. One or more of the playback device or a user of the playback device may assign an overall rating to the content fragment based on the perceived quality of presentation of the content fragment.

Sending the plurality of versions of the content fragment to one or more devices may comprise sending to a first device the version of the first content fragment comprising the first type of encoding and sending to a second device the second version of the content fragment comprising the second type of encoding. The quality measurement of a given version of the content fragment may depend on one or more characteristics of a device that is requesting playback of the content fragment. A high definition (HD) television that receives a version of a content fragment with average video quality and high audio quality may assign a rating of five out of ten to the version of the content fragment as the average video quality will be easily detected by the HD television. However, a cellular telephone requesting the same version of the content fragment may assign a value of eight out of ten to the version of the content fragment as the average video quality on the smaller screen of the cellular telephone may be less apparent.

At step 208, a version of the first content fragment may be selected. The version of the first content fragment may be selected based on the received quality measurements. Selecting the version of the first content fragment may comprise determining that a quality measurement associated with a version of the first content fragment exceeds a quality measurement associated with another version of the first content fragment.

At step 210, a version of the second content fragment may be selected. The version of the second content fragment may be selected based on the received quality measurements. Selecting the version of the second content fragment may comprise determining that a quality measurement associated with a version of the second content fragment exceeds a quality measurement associated with another version of the second content fragment.

The playlist generator may receive the quality measurements from the one or more devices and may be configured to determine that a second version of a first content fragment received a higher quality ranking than a first version of the first content fragment. The playlist generator may additionally or alternatively determine that a first version of a second content fragment received a higher quality measurement than a second version of the second content fragment. Thus, the playlist generator may determine a playlist comprising the second version of the first content fragment and the first version of the second content fragment.

At step 212, a playlist may be determined. The playlist may comprise the selected version of the first content fragment and the selected version of the second content fragment. The playlist may comprise at least one content fragment comprising the first type of encoding and at least one content fragment comprising the second type of encoding.

Figure 3:
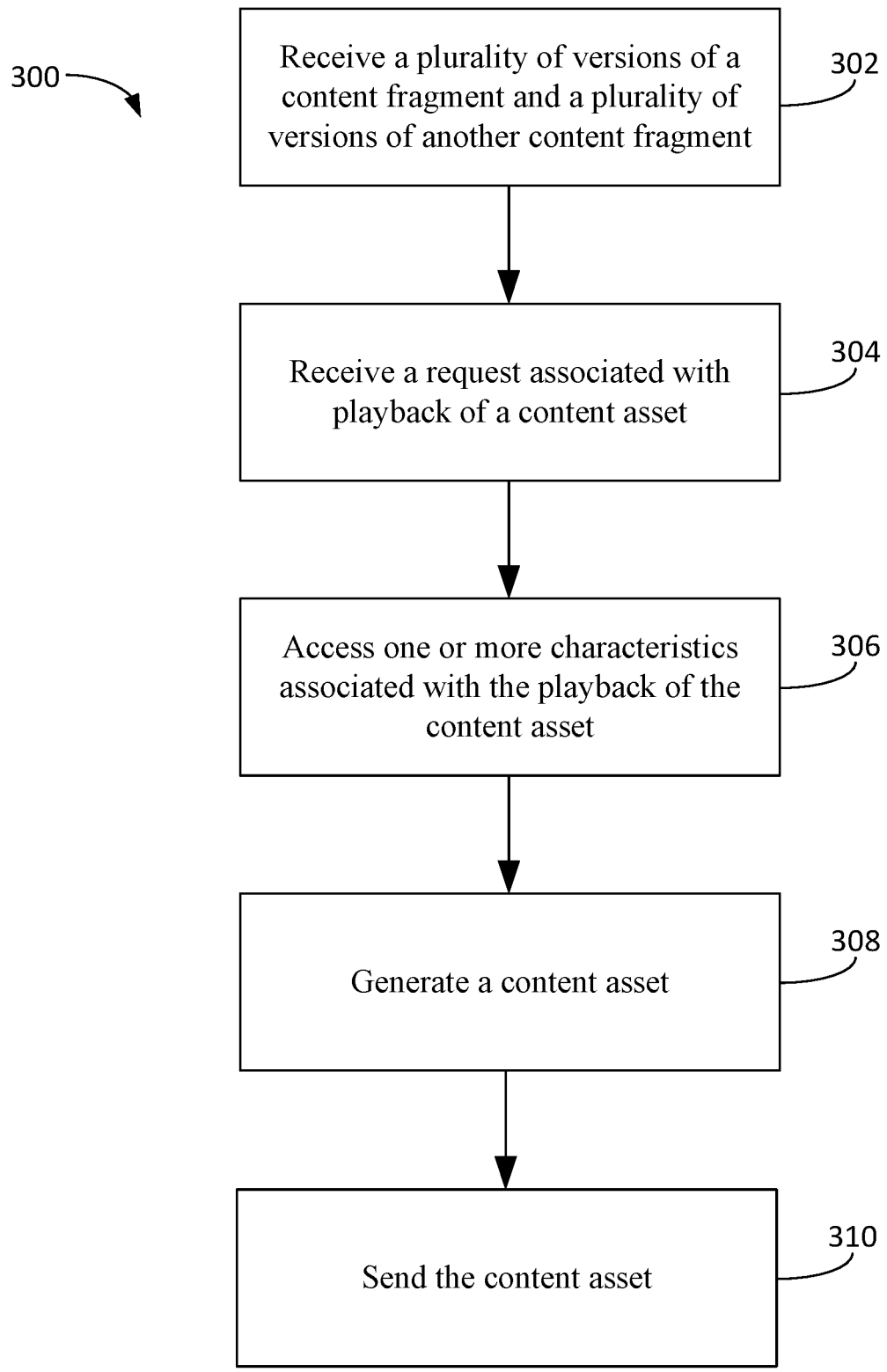
FIG. 3 is a flow chart of an example method.

FIG. 3 shows a flow chart of an example method 300 for generating a content asset comprising one or more content fragments. At step 302, a plurality of versions of a content fragment may be received. A plurality of versions of another content fragment may be received. The plurality of versions of the content fragment and the plurality of versions of the another content fragment may be associated with one or more content assets. The one or more content assets may comprise any media asset that is capable of being played back by a device, such as a movie asset, a television asset, or a streaming media asset. The content fragment may correspond to a portion of the content asset, such as a two second portion of the content asset or a ten second portion of the content asset. The plurality of versions of the content fragment and the plurality of versions of the another content fragment may be received by a content asset generator, such as the content asset generator 106 shown in FIG. 1. The plurality of versions of the content fragment and the plurality of versions of the another content fragment may be sent to the content asset generator by one or more encoders, such as the encoders 102 shown in FIG. 1.

A version of the content fragment may comprise a first type of encoding and another version of the content fragment may comprise a second type of encoding. An encoder such as encoder 102-A may be configured to encode a content fragment using a first type of encoding and another encoder such as encoder 102-B may be configured to encode the content fragment using a second type of encoding. Each of the first type of encoding and the second type of encoding may comprise one or more characteristics that make the corresponding version of the content fragment more favorable based on one or more characteristics of the content fragment and/or one or more characteristics of the device requesting playback of the content fragment. One type of encoding may be preferred for determining a content fragment with high-quality still images, another type of encoding may be preferred for determining a content fragment with high-quality video, and another type of encoding may be preferred for determining a content fragment with high-quality audio.

At step 304, a request associated with playback of a content asset may be received. The request may be determined by one or more devices, such as the device 110 shown in FIG. 1. The request may include one or more characteristics of the device requesting playback of a content asset. The one or more characteristics of the device requesting playback of the content asset may include but are not limited to an identifier of the device, one or more video capabilities of the device, one or more audio capabilities of the device, and one or more network capabilities associated with the device. A video capability of the device may comprise for a maximum pixel resolution, a maximum refresh rate, and a size of a screen associated with the playback device. An audio capability may comprise an indication of a maximum decibel level capable of being output by the device and whether surround sound is supported by the device. It is understood that the above-listed video and audio capabilities are exemplary only and that other video and audio capabilities may additionally or alternatively be provided.

At step 306, one or more characteristics associated with the playback of the content asset may be accessed. The one or more characteristics associated with playback of the content asset may comprise the one or more characteristics of the device requesting playback of the content asset, such as the identifier of the device, the one or more video capabilities of the device, the one or more audio capabilities of the device, and the one or more network capabilities associated with the device. The one or more characteristics associated with playback of the content asset may comprise one or more characteristics of the content asset, such as the type of content asset (e.g., television or movie), the size of the content asset, or the length of the content asset. The one or more characteristics associated with playback of the content asset may comprise one or more characteristics of one or more users associated with one or more devices requesting playback or that have previously requested playback of the content asset, including but not limited to subscriber demographics such as age, gender and race. One or more other characteristics associated with playback of the content asset may include but are not limited to a network bandwidth and a popularity of the content asset, such as how often the content asset has been requested over a given day or month.

At step 308, a content asset may be determined. The content asset may comprise a selected one of the plurality of versions of the content fragment. The content asset may comprise a selected one of the plurality of versions of the another content fragment. The content asset may be determined based on the one or more characteristics associated with the playback of the content asset. Based on receiving a request for a content asset from a high definition (HD) television with characteristics that include a high maximum pixel resolution and a high refresh rate, the content asset generator may generate a content asset comprising content fragments received from encoders known to produce content fragments with high video quality. Based on receiving a request for a content asset from a cellular telephone having average video quality and below average bandwidth, the content asset generator may generate a content asset with average or below average video quality to improve playback quality by the cellular telephone.

The content asset generator may be configured to determine that a second version of a first content fragment comprises more of the desired playback characteristics than a first version of the first content fragment. The playlist generator may additionally or alternatively determine that a first version of a second content fragment comprises more of the desired playback characteristics than a second version of the second content fragment. Thus, the playlist generator may generate a content asset comprising the second version of the first content fragment and the first version of the second content fragment.

An indication of a quality measurement associated with one or more of the plurality of versions of the content fragment may be accessed. An indication of a quality measurement associated with one or more of the plurality of versions of the another content fragment may be accessed. The indications of the quality measurements may be received from the one or more devices. A quality measurement associated with a content fragment may correspond to objective and/or subjective measurements associated with presentation of the content fragment by the playback device. Generating the content asset may comprise determining that a quality measurement associated with a version of the content fragment exceeds a quality measurement associated with another version of the content fragment. Generating the content asset may comprise determining that a quality measurement associated with a version of the another content fragment exceeds a quality measurement associated with another version of the another content fragment. The determined content asset may comprise the version of the content fragment and the version of the another content fragment.

At step 310, the content asset may be sent to the device. The content asset may comprise the version of the content fragment and the version of the another content fragment. It is understood that the content asset may comprise any number of content fragments. One or more of the number of content fragments may be selected from among a number of versions of the corresponding content fragment. The content asset may be stored by the content server and may be sent to one or more other devices. The content asset may be sent to the one or more other devices based on a request from the one or more devices for the content asset and based on determining that one or more characteristics associated with playback of the content asset by the one or more devices are similar to the characteristics of the stored content asset.

Figure 4:
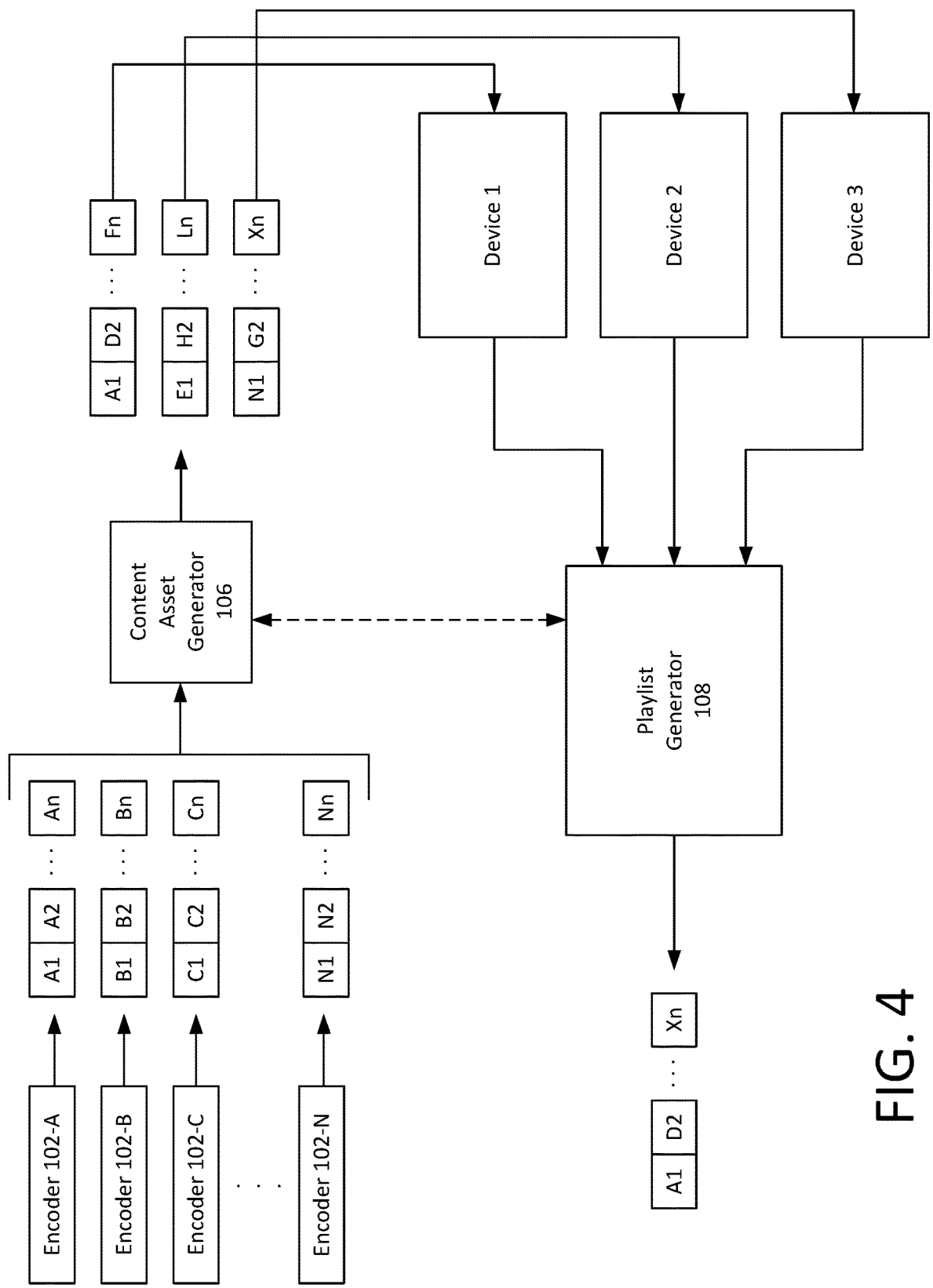
FIG. 4 is a flow chart of an example method.

FIG. 4 shows an example block diagram of a method for determining a content playlist. One or more encoders may be configured to output to a content asset generator a content asset comprising one or more content fragments. The encoders may be the encoders 102 shown in FIG. 1. The content asset generator may be the content asset generator 106 shown in FIG. 1. Each of the encoders may be configured to encode one or more content assets in accordance with one or more encoding characteristics.

The content asset generator may be configured to receive the one or more content assets from the one or more encoders. Each of the content assets may comprise any number of content fragments. Content asset A output by encoder 102-A may comprise content fragments A1, A2, . . . An. Content asset B output by encoder 102-B may comprise content fragments B1, B2, . . . Bn. Content fragment A1 and content fragment B1 may represent different versions of a given content fragment. The content fragment versions A1 and B1 may comprise the same content but may comprise different encoding characteristics. The content asset generator may determine one or more content assets based on one or more of the characteristics of the encoders, the characteristics of the received content fragments, and the characteristics of a device configured to play back the content asset.

The content asset generator 106 may determine to determine a first content asset with high video quality. The content asset generator may determine that content fragment A1 comprises high video quality and that content fragment D2 comprises high video quality. Thus, the content asset generator may generate a content asset comprising content fragment A1 and content fragment D2. The content asset generator may generate a content asset having high audio quality. The content asset generator may determine that content fragment E1 comprises high audio quality and that content fragment H2 comprises high audio quality. Thus, the content asset generator 106 may generate a content asset comprising content fragment D1 and content fragment H2.

The determined content assets may be sent to one or more devices. The content assets may be determined based on a request from the one or more devices. Device 1 may be an HD television that has high quality video playback capabilities. Based on a request from Device 1 for a content asset, the content asset generator may generate a content asset comprising content fragments having high video quality. The content assets may be determined prior to receiving the request from the one or more devices. The content asset generator may generate a content asset comprising high video quality and, based on receiving from Device 1 a request for a content asset and based on determining that Device 1 supports high quality video playback, the content asset generator may send to Device 1 the content asset comprising content fragments with high video quality. Device 2 may be a device that is capable of high quality audio playback. The content asset generator 106 may be configured to send to the Device 2 a content asset comprising content fragments rated for high quality audio.

The device 110 may be configured to determine a quality for each of a plurality of content fragments of a content asset. The quality measurements may be based on one or more objective or subjective measurements. The quality measurements may be based on a scale, such as a scale ranging from one to ten. The Device 1 may receive the content asset comprising the content fragment A1 and the content fragment D2. The Device 1 may rate the playback of the content fragment based on a number of factors, such as a video quality and an audio quality of the content fragment. Content fragment A1 may be assigned a value of seven out of ten while content fragment D2 may be assigned a value of four out of ten. Similarly, Device 2 may assign to content fragment E1 a value of eight out of ten and may assign to content fragment H2 a value of three out of ten. Each of the devices may be configured to send the quality measurements to the playlist generator.

The playlist generator may be configured to receive from a plurality of devices quality information associated with one or more content fragments of one or more content assets. The playlist generator may be the playlist generator 108 shown in FIG. 1. While FIG. 4 shows a playlist generator configured to receive input from three devices, it is understood that the playlist generator may receive input from any number of devices. The playlist generator may be configured to receive quality measurements associated with a plurality of versions of a plurality of content fragments of a content asset. Each of the plurality of versions of a content fragment may correspond to different encoding characteristics applied to the content fragment. The plurality of versions of the content fragment may be associated with a quality measurement, such as the ranking information. The playlist generator may be configured to determine a content playlist based on the received rankings information.

The playlist generator may be configured to receive rankings information associated with five versions of a content fragment (A1 through E1). The playlist generator may determine that version A1 of the content fragment may have an average ranking received from one or more devices of nine out of ten. Six devices may have ranked the content fragment version A1 with a score of ten, eight devices may have ranked A1 with a score of nine, and six devices may have ranked A1 with a score of 8. The remaining versions of the content fragments may have been similarly ranked by one or more devices. Version B1 may have an average ranking of five out of ten, version C1 may have an average rating of two out of ten, version D1 may have an average ranking of six out of ten, and version E1 may have an average ranking of seven out of ten. Thus, the playlist generator may determine to determine a content playlist with the content fragment version having the highest overall ranking (A1).

The playlist generator may be configured to receive rankings information associated with five versions of another content fragment (A2 through E2). The playlist generator may determine that version A2 of the another content fragment may have an average ranking of three out of ten, version B2 may have an average ranking of five out of ten, version C2 may have an average rating of two out of ten, version D2 may have an average ranking of eight out of ten, and version E2 may have an average ranking of six out of ten. Thus, the playlist generator may determine to determine a content playlist with the another content fragment version having the highest overall ranking (D2).

The playlist generator may be configured to send to one or more devices a content playlist comprising the highest ranked version of each content fragment. The playlist generator may be configured to send to one or more devices a content asset comprising content fragment A1 and content fragment D2. The content asset may comprise one or more other content fragments that may or may not have been analyzed by one or more devices. The playlist generator may be configured to send to the content asset generator the received quality information associated with the one or more content fragments. The content asset generator may be configured to use the quality measurements in determining future content assets for sending to the one or more devices.

Figure 5:
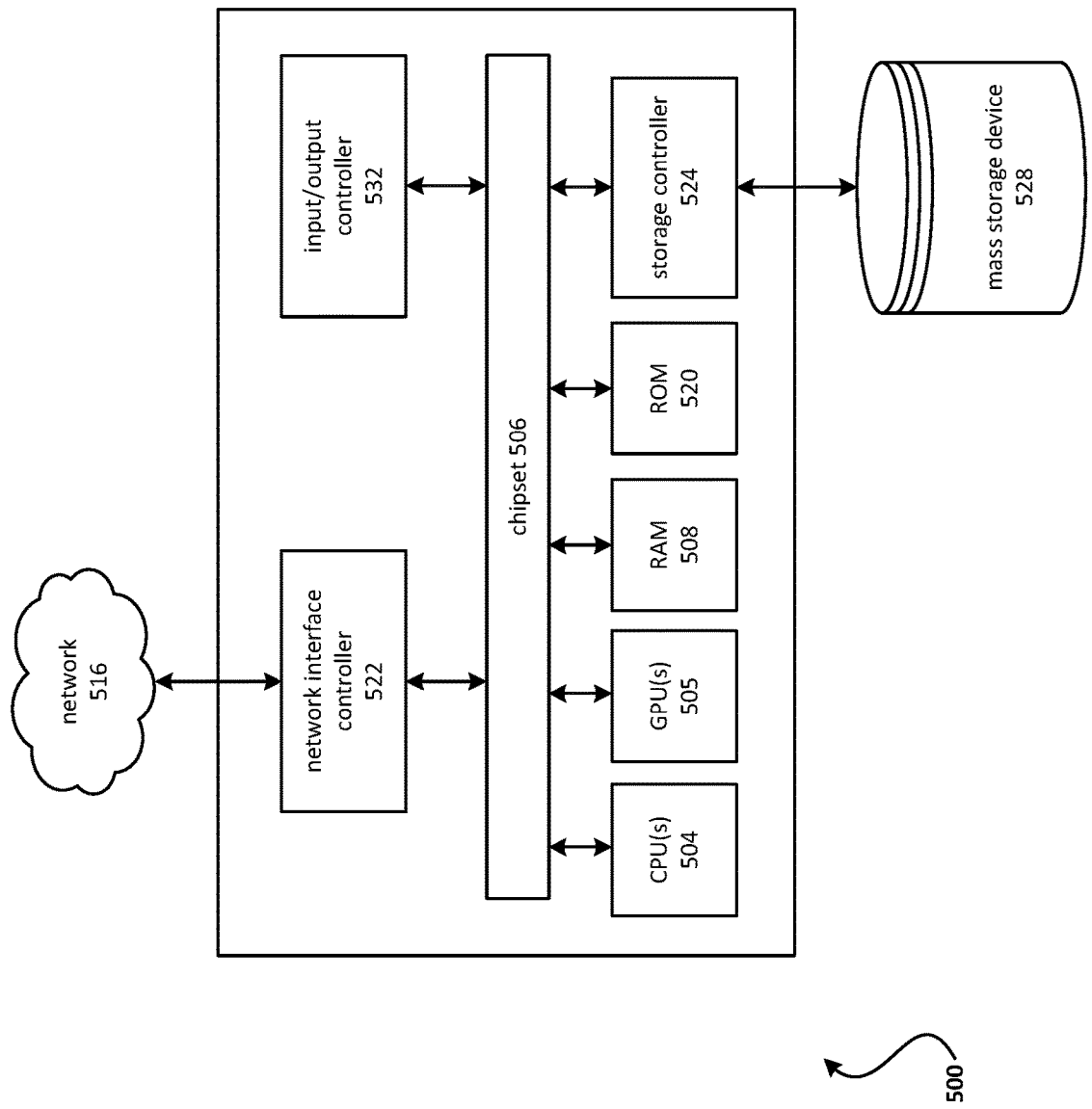
FIG. 5 is a block diagram of an example computing device.

FIG. 5 depicts a computing device that may be used in various aspects, such as the servers, modules, and/or devices depicted in FIG. 1. With regard to the example architecture of FIG. 1, the encoders 102, the content asset generator 106, the playlist generator 108, the device 110, and/or the display 112 may each be implemented in an instance of a computing device 500 of FIG. 5. The computer architecture shown in FIG. 5 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2-4.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A user interface may be provided between the CPU(s) 504 and the remainder of the components and devices on the baseboard. The interface may be used to access a random access memory (RAM) 508 used as the main memory in the computing device 500. The interface may be used to access a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein. The user interface may be provided by a one or more electrical components such as the chipset 506.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a storage device 528 that provides non-volatile storage for the computer. The storage device 528 may store system programs, application programs, other program modules, and data, which have been described in greater detail herein. The storage device 528 may be connected to the computing device 500 through a storage controller 524 connected to the chipset 506. The storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 528 is characterized as primary or secondary storage and the like.

For example, the computing device 500 may store information to the storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the storage device 528 by detecting the physical states or characteristics of one or more particular locations within the physical storage units.

In addition or alternatively to the storage device 528 described herein, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology.

Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 528 may store other system or application programs and data utilized by the computing device 500.

The storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described herein. The computing device 500 may have access to computer-readable storage media storing computer-executable instructions, which, when executed by the computing device 500, may perform the methods described in relation to FIGS. 2-4.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as determined data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, from a first plurality of devices that are configured to output a first content fragment, a plurality of first quality measurements associated with a plurality of versions of the first content fragment, wherein the first quality measurements are determined on the first plurality of devices;
   receiving, from a second plurality of devices that are configured to output a second content fragment, a plurality of second quality measurements associated with a plurality of versions of the second content fragment, wherein the second quality measurements are determined on the second plurality of devices, and wherein the second plurality of devices overlap with the first plurality of devices;
   selecting, based on the plurality of first quality measurements, a version of the first content fragment from among the plurality of versions of the first content fragment;
   selecting, based on the plurality of second quality measurements, a version of the second content fragment from among the plurality of versions of the second content fragment; and
   determining a playlist comprising the selected version of the first content fragment and the selected version of the second content fragment.

2. The method of claim 1, wherein the selected version of the first content fragment is encoded according to a first type of encoding and the selected version of the second content fragment is encoded according to a second type of encoding that is different from the first type of encoding.

3. The method of claim 1, wherein:
   the plurality of first quality measurements are based on at least one of a video quality and an audio quality associated with the plurality of versions of the first content fragment; and the plurality of second quality measurements are based on at least one of a video quality and an audio quality associated with the plurality of versions of the second content fragment.

4. The method of claim 1, wherein:
selecting the version of the first content fragment from among the plurality of versions of the first content fragment comprises determining that first quality measurements associated with a first version of the first content fragment exceed first quality measurements associated with a second version of the first content fragment;
selecting the version of the second content fragment from among the plurality of versions of the second content fragment comprises determining that second quality measurements associated with a first version of the second content fragment exceed second quality measurements associated with a second version of the second content fragment; and
determining the playlist comprises determining the playlist comprising the first version of the first content fragment and the first version of the second content fragment.

5. The method of claim 1, further comprising:
sending, to the first plurality of devices, the plurality of versions of the first content fragment associated with a content asset; and
sending, to the second plurality of devices, the plurality of versions of the second content fragment associated with the content asset.

6. The method of claim 1, wherein the plurality of first quality measurements are determined based on one or more characteristics of the first plurality of devices.

7. The method of claim 1, wherein:
the plurality of first quality measurements are first objective measurements and/or first subjective measurements; and
the plurality of second quality measurements are second objective measurements and/or second subjective measurements.

8. The method of claim 7, wherein the first subjective measurements are received from users of the first plurality of devices.

9. A device comprising:
at least one processor; and
memory storing computer-executable instructions which, when executed by the at least one processor, cause the device to:
receive, from a first plurality of devices that are configured to output a first content fragment, a plurality of first quality measurements associated with a plurality of versions of the first content fragment, wherein the first quality measurements are determined on the first plurality of devices;
receive, from a second plurality of devices that are configured to output a second content fragment, a plurality of second quality measurements associated with a plurality of versions of the second content fragment, wherein the second quality measurements are determined on the second plurality of devices, and wherein the second plurality of devices overlap with the first plurality of devices;
select, based on the plurality of first quality measurements, a version of the first content fragment from among the plurality of versions of the first content fragment;
select, based on the plurality of second quality measurements, a version of the second content fragment from among the plurality of versions of the second content fragment; and
determine a playlist comprising the selected version of the first content fragment and the selected version of the second content fragment.

10. The device of claim 9, wherein the selected version of the first content fragment is encoded according to a first type of encoding and the selected version of the second content fragment is encoded according to a second type of encoding that is different from the first type of encoding.

11. The device of claim 9, wherein:
the plurality of first quality measurements are based on at least one of a video quality and an audio quality associated with the plurality of versions of the first content fragment; and
the plurality of second quality measurements are based on at least one of a video quality and an audio quality associated with the plurality of versions of the second content fragment.

12. The device of claim 9, wherein the instructions, when executed, cause the device to:
select the version of the first content fragment from among the plurality of versions of the first content fragment by determining that first quality measurements associated with a first version of the first content fragment exceed first quality measurements associated with a second version of the first content fragment;
select the version of the second content fragment from among the plurality of versions of the second content fragment by determining that the second quality measurements associated with a first version of the second content fragment exceed second quality measurements associated with a second version of the second content fragment; and
determine the playlist by determining the playlist comprising the first version of the first content fragment and the first version of the second content fragment.

13. The device of claim 9, wherein the instructions, when executed, further cause the device to:
send, to the first plurality of devices, the plurality of versions of the first content fragment associated with a content asset; and
send, to the second plurality of devices, the plurality of versions of the second content fragment associated with the content asset.

14. The device of claim 9, wherein the plurality of first quality measurements are determined based on one or more characteristics of the first plurality of devices.

15. The device of claim 9, wherein:
the first quality measurements are first objective measurements and/or first subjective measurements; and
the second quality measurements are second objective measurements and/or second subjective measurements.

16. The device of claim 15, wherein the first subjective measurements are received from users of the first plurality of devices.

17. A non-transitory computer-readable medium storing instructions that, when executed, cause at least one processor to:
receive, from a first plurality of devices that are configured to output a first content fragment, a plurality of first quality measurements associated with a plurality of versions of the first content fragment, wherein the first quality measurements are determined on the first plurality of devices;

receive, from a second plurality of devices that are configured to output a second content fragment, a plurality of second quality measurements associated with a plurality of versions of the second content fragment, wherein the second quality measurements are determined on the second plurality of devices, and wherein the second plurality of devices overlap with the first plurality of devices;

select, based on the plurality of first quality measurements, a version of the first content fragment from among the plurality of versions of the first content fragment;

select, based on the plurality of second quality measurements, a version of the second content fragment from among the plurality of versions of the second content fragment; and determine a playlist comprising the selected version of the first content fragment and the selected version of the second content fragment.

18. The non-transitory computer-readable medium of claim 17, wherein the selected version of the first content fragment is encoded according to a first type of encoding and the selected version of the second content fragment is encoded according to a second type of encoding that is different from the first type of encoding.

19. The non-transitory computer-readable medium of claim 17, wherein:

the plurality of first quality measurements are based on at least one of a video quality and an audio quality associated with the plurality of versions of the first content fragment; and the plurality of second quality measurements are based on at least one of a video quality and an audio quality associated with the plurality of versions of the second content fragment.

20. The non-transitory computer-readable medium of claim 17, wherein the instructions, when executed, cause the at least one processor to:

select the version of the first content fragment from among the plurality of versions of the first content fragment by determining that first quality measurements associated with a first version of the first content fragment exceed first quality measurements associated with a second version of the first content fragment;

select the version of the second content fragment from among the plurality of versions of the second content fragment by determining that the second quality measurements associated with a first version of the second content fragment exceed second quality measurements associated with a second version of the second content fragment; and determine the playlist by determining the playlist comprising the first version of the first content fragment and the first version of the second content fragment.

21. The non-transitory computer-readable medium of claim 17, wherein:

the plurality of first quality measurements are first objective measurements and/or first subjective measurements; and the plurality of second quality measurements are second objective measurements and/or second subjective measurements.

* * * * *